(12) United States Patent
Whittaker et al.

(10) Patent No.: US 12,425,669 B2
(45) Date of Patent: *Sep. 23, 2025

(54) SYSTEMS AND METHODS TO DELIVER CONTENT DURING CLIENT AUTHENTICATION PROCESS IN A DISTRIBUTED COMPUTING SYSTEM

(71) Applicant: Google LLC, Mountain View, CA (US)

(72) Inventors: Colin Whittaker, Newton, MA (US); David Lee, Mountain View, CA (US); Haidong Shao, Foster City, CA (US); Adrian Isles, Oakland, CA (US); John Draper, San Francisco, CA (US); Maxim Kovalkov, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 18/120,956

(22) Filed: Mar. 13, 2023

(65) Prior Publication Data
US 2023/0217054 A1    Jul. 6, 2023

Related U.S. Application Data

(63) Continuation of application No. 17/191,335, filed on Mar. 3, 2021, now Pat. No. 11,606,590.

(51) Int. Cl.
*H04N 21/258* (2011.01)
*H04L 9/40* (2022.01)
(Continued)

(52) U.S. Cl.
CPC ... *H04N 21/25816* (2013.01); *H04L 63/0807* (2013.01); *H04L 65/612* (2022.05); *H04N 21/2541* (2013.01)

(58) Field of Classification Search
CPC .......... H04N 21/25816; H04N 21/2541; H04L 65/612; H04L 63/0807
See application file for complete search history.

(56) References Cited

U.S. PATENT DOCUMENTS 10,108,788 B2* 10/2018 Watson .............. H04N 21/4826
2014/0201368 A1* 7/2014 Bouazizi ................. H04L 65/80
709/225
(Continued)

FOREIGN PATENT DOCUMENTS

EP    2605168 A3    5/2014
EP    2846555 A1    3/2015
(Continued)

OTHER PUBLICATIONS

PCT Notification of Transmittal Of The International Search Report And The Written Opinion Of The International Searching Authority for PCT Application No. PCT/US2022/018568, mailed Jun. 1, 2022, 6 pages.

(Continued)

*Primary Examiner* — Sumaiya A Chowdhury
(74) *Attorney, Agent, or Firm* — Lowenstein Sandler LLP

(57) ABSTRACT

A method includes receiving, by a content distribution network server, a first request for content, the first request for content comprising an identifier of a location of the content. Playback of the requested content is caused to begin at a client device. A content-based authentication token generated by the client device is received, wherein the content-based authentication token is associated with a second request for content that is initiated by the client device, and the content-based authentication token is sent for verification by a content sharing platform. Responsive to receiving (Continued)

an indication that the content-based authentication token is valid, playback of the requested content is caused to continue at the client device.

20 Claims, 6 Drawing Sheets

(51) Int. Cl.
*H04L 65/612* (2022.01)
*H04N 21/254* (2011.01)

(56) References Cited

U.S. PATENT DOCUMENTS

| | | |
|---|---|---|
| 2014/0282982 A1 | 9/2014 | Rothschild et al. |
| 2015/0074818 A1 | 3/2015 | Watson et al. |
| 2016/0294795 A1 | 10/2016 | Drope |
| 2017/0187771 A1 | 6/2017 | Falcon |
| 2017/0264593 A1* | 9/2017 | Biswal ................ H04L 63/0428 |
| 2018/0121633 A1 | 5/2018 | Bi et al. |
| 2020/0344307 A1 | 10/2020 | Livshits et al. |
| 2021/0303712 A1 | 9/2021 | Bowen |

FOREIGN PATENT DOCUMENTS

| | | |
|---|---|---|
| TW | 201038032 A | 10/2010 |
| WO | 2017015289 A1 | 1/2017 |

OTHER PUBLICATIONS

Office Action for Japanese Patent Application No. 2023541103, mailed Sep. 9, 2024, 05 Pages.

Office Action for Taiwan Patent Application No. 113103069, mailed Aug. 1, 2024, 08 Pages.

\* cited by examiner

SYSTEMS AND METHODS TO DELIVER CONTENT DURING CLIENT AUTHENTICATION PROCESS IN A DISTRIBUTED COMPUTING SYSTEM

RELATED APPLICATIONS

This application is a continuation of U.S. patent application Ser. No. 17/191,335, filed Mar. 3, 2021, the entire content of which is hereby incorporated by reference.

TECHNICAL FIELD

Aspects and embodiments of the disclosure relate to content sharing platforms, and more specifically, to enabling content delivery while performing the client authentication process.

BACKGROUND

Content delivery platforms connecting via the Internet allow users to connect to and share information with each other. Many content delivery platforms include a content sharing aspect that allows users to upload, view, and share content, such as video items, image items, audio items, and so on. Other users of the content delivery platform may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

An aspect of the disclosure provides a method comprising: receiving, by a content distribution network server, a first request for content, the first request for content comprising an identifier of a location of the content; causing playback of the requested content to begin at a client device; receiving a content-based authentication token generated by the client device, wherein the content-based authentication token is associated with a second request for content that is initiated by the client device; sending the content-based authentication token for verification by a content sharing platform; and responsive to receiving an indication that the content-based authentication token is valid, causing playback of the requested content to continue at the client device.

A further aspect of the disclosure provides a system comprising: a memory; and a processing device, coupled to the memory, the processing device to perform a method according to any aspect or embodiment described herein.

A further aspect of the disclosure provides a non-transitory computer-readable medium comprising instructions that, responsive to execution by a processing device, cause the processing device to perform operations according to any aspect or implementation described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
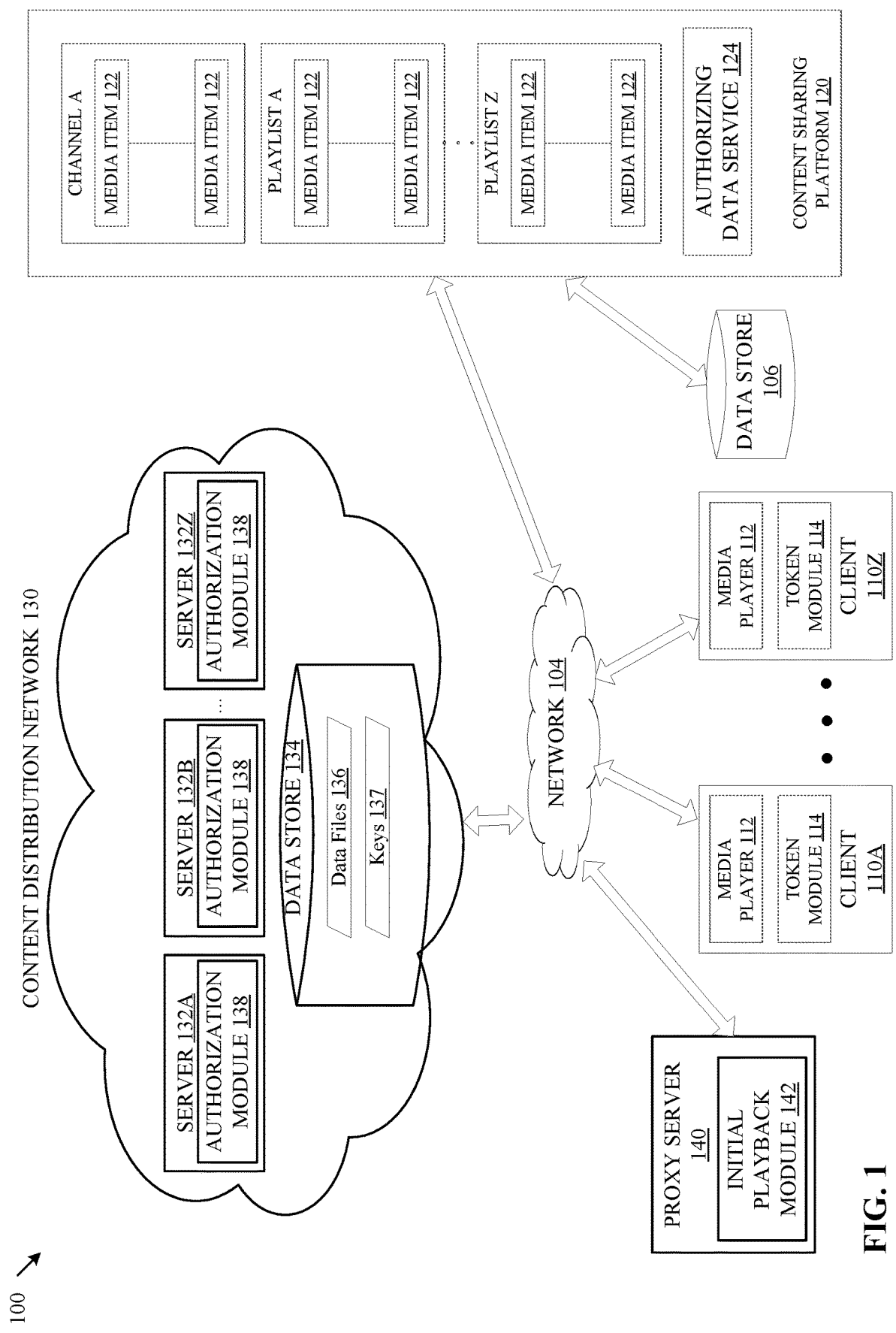
FIG. 1 illustrates an example system architecture, in accordance with an embodiment of the disclosure.

A content sharing platform (also referred to as a "content delivery platform" herein) may offer content, such as video items, audio items, or gaming items, to users via client devices. A user may log in to a user account associated with the content sharing platform to access the content sharing platform and upload and/or consume the content. The content sharing platform may use a content distribution network (CDN) (also referred to as a "content delivery network" herein) to deliver the content to client devices. A CDN can include a geographically distributed network of servers that work together to provide high availability and high performance in the delivery of content. For example, server A of the CDN that is in a same geographical vicinity as client device A can be selected to deliver content to client device A. Content delivered by server A can be delivered to client device A faster than another server, server B of CDN, that is not located in the same geographical vicinity as client device A.

In some systems, a user, via an authorized media player (e.g., provided by a mobile application, a web browser, etc.) of the client device, can request content from a content sharing platform. The content sharing platform, using an authorization service, can authorize the user account associated with the user to determine whether the user has permission to access the requested content. If the user account is authorized to access the content, the content sharing platform can generate one or more resource locators (e.g., uniform resource locators (URLs)) that can be used by the client device to obtain the requested content from a CDN.

However, in some instances, a user can use an unauthorized media player (e.g., an overlay application, a third party media player, a modified media player, etc.) to access content from the CDN and perform unauthorized functions on the received content. For example, the unauthorized media player can be capable of downloading the received content onto a storage medium, a feature that can be prohibited by authorized media players. In current systems, it is difficult to identify content requests from unauthorized media players. This can cause the content sharing platform to mistakenly grant permission to an unauthorized media player to access the requested content, leading to the unauthorized media player performing unauthorized functions on the received content. Furthermore, although an authorized media player can generate difficult-to-forge authentication tokens for each content request, which can attest to the authenticity of the authorized media player, generating these content-related authentication tokens can be time consuming. As such, use of the content-related authentication tokens can cause undesirable latency for each content request, which can inconvenience the user.

Aspects and implementations of the present disclosure address these and other shortcomings of the existing technology by enabling a client device to consume a portion of the desired content while generating a content-based authentication token to be used to obtain the remaining portion of the desired content. In particular, a user can select content to consume on the client device. The client device can then initiate the generation of an authentication token based on the desired content (a content-based authentication token), and send a request for the desired content to the content sharing platform. In some embodiments, in response to the request, the content sharing platform can identify addresses (CDN resource locators) associated with a CDN server for accessing the requested content, append one or more cryptographically signed parameters to the CDN resource locators and return the resulting resource locators. The parameters can include, for example, an expiration parameter to indicate an expiration time for the use of the resource locators, a bit rate parameter to indicate a desired bit rate for the requested content, a playback event identifier parameter to identify a playback event associated with the content request, etc.), which can be used to indicate to the CDN how the requested content accessed via the resource locators is to be served. The parameters can also indicate that the CDN should provide the client device with an initial playback of the requested content (e.g., a first portion of the requested content, such as the initial 5 seconds of a requested video), and that each additional request for the remainder of the desired content should include the content-based authentication token.

While consuming the initial playback, the client device can finish generating the content-based authentication token. Accordingly, the client device can then send a request, along with the content-based authentication token, to the CDN for another portion of the requested content. The CDN can then authenticate the content-based authentication token and, responsive to the CDN verifying the authenticity of the content-based authentication token, the CDN can send an additional resource locator for another portion of the requested content to the client device. In some embodiments, each additional request for a portion of the remaining content should be accompanied by the content-based authentication token. Responsive to the CDN receiving an additional request with the content-based authentication token and authenticating the content-based authentication token, the CDN provides a content portion corresponding to the additional content request. Responsive to the CDN receiving an additional request without the content-based authentication token (or if the CDN fails to authenticate the content-based authentication token), the CDN can reject the additional content request.

In some embodiments, in which the requested content can be accessed via a single resource locator, the content sharing platform can append the resource locator with one or more cryptographically signed parameters indicating that the CDN should provide the client device with playback of the requested content fora predetermined amount of time (e.g., 5 seconds), after which the playback should either continue or be terminated. In particular, the CDN should terminate the playback if the CDN does not receive a content-based authentication token within the predetermined amount of time. Alternatively, the CDN should continue the playback if the CDN receives a content-based authentication token within the predetermined amount of time. In some implementations, the client device can start consuming the content using a primary communication channel, and once the content-based authentication token is generated, send the token to the CDN using, for example, a side channel (e.g., a separate communication channel, a different port, etc.). Responsive to the CDN receiving the content-based authentication token, the CDN can allow the client device to finish the consumption of the requested content.

Aspects of the present disclosure result in improved performance of the media player of a client device and improved performance of a content sharing platform. In particular, the aspects of the present disclosure enable a content sharing platform and a CDN to verify the authenticity of the media player requesting content by using difficult-to-forge authentication tokens, thereby preventing unauthorized media players from accessing content from the CDN and performing unauthorized functions on the content. Further, the technology disclosed herein enables the generation of difficult-to-forge authentication tokens without subjecting a user to an undesired latency. As such, the technology disclosed herein enables the user to have a stable and uninterrupted viewing experience.

Implementations of the present disclosure often reference videos for simplicity and brevity. However, the teaching of the present disclosure are applied to media items generally and may be applied to various types of content, including for example, video, audio, text, images, program instructions, etc.

FIG. 1 illustrates an example system architecture 100, in accordance with one implementation of the present disclosure. The system architecture 100 (also referred to as "system" herein) includes a content sharing platform 120 (also referred to as a "content distribution platform" herein), a data store 106, client devices 110A-110Z (generally referred to as "client device(s) 110" herein) connected to a network 104, a proxy server 140, and a content distribution network (CDN) 130 (also referred to as a "content delivery network" herein). The CDN 130 may include a plurality of server machines 132A-132Z (also referred to as "server(s) 132A-132Z" herein).

Network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Data store 106 may be a persistent storage that is capable of storing content items (such as media items) as well as data structures to tag, organize, and index the content items. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by content sharing platform 120 or one or more different machines coupled to the content sharing platform 120. In some embodiments, data store 106 may be coupled to content sharing platform 120 via network 104.

Client devices 110A-110Z may each include computing devices such as personal computers (PCs), laptops, mobile phones, smart phones, tablet computers, netbook computers, network-connected televisions, etc. In some embodiments, client devices 110A-110Z may also be referred to as "user devices." In some embodiments, each client device 110A-110Z may include a media player 112 (or media viewer) and a token module 114. In some embodiments, the media players 112 may be applications that allow users to playback, view, or upload content, such as images, video items, web pages, documents, audio items, etc. For example, the media player 112 may be a web browser that can access, retrieve, present, or navigate content (e.g., web pages such as Hyper Text Markup Language (HTML) pages, digital media items, etc.) served by a web server. The media player 112 can render, display, or present the content (e.g., a web page, a media viewer) to a user. The media player 112 can also include an embedded media player (e.g., a Flash® player or an HTML5 player) that is embedded in a web page (e.g., a web page that may provide information about a product sold by an online merchant). In another example, the media player 112 can be a standalone application (e.g., a mobile application, or native application) that allows users to playback digital media items (e.g., digital video items, digital images, electronic books, etc.). According to aspects of the present disclosure, the media player 112 can be a content sharing platform application for users to record, edit, and/or upload content for sharing on the content sharing platform. As such, the media players 112 can be provided to the client devices 110A-110Z by content sharing platform 120. For example, the media players 112 can be embedded media players that are embedded in web pages provided by the content sharing platform 120. In another example, the media players 112 may be applications that are downloaded from content sharing platform 120.

Token module 114 hosted by the client device 110 can be used to generate one or more authentication tokens. The authentication token(s) can be generated for each content request of digital media items. The authentication token can be sent by client 110 to content sharing platform 120, content distribution network 130, and/or proxy server 140, which can then perform an authentication process by decrypting the authentication token, determining a cryptographic signature of the authentication token, inspecting a spam bit of the authentication token, and/or performing any other process associated with authenticating the token. Responsive to authenticating the authentication token(s), the content sharing platform 120 and/or content distribution network 130 can initiate or continue playback of the requested digital media item. In some embodiments, the authentication token(s) can be periodically sent to at least one of content sharing platform 120 and/or content distribution network 130 to reconfirm the authenticity of client 110 and/or the content request, as will be discussed in more detail below.

In some embodiments, the authentication token can be a session-based authentication token and/or a content-based authentication token. The session-based authentication token can be an authentication token generated using data associated with a user or a user account initiating the content request for a digital media item. For example, the session-based authentication token can be generated using information identifying client device 110 or an application of client device 110, and a hashing algorithm. The identifying information can be, for example, in the form of a cookie which can refer to a file that is stored at the client device 110 and holds some amount of data specific to the particular client device or application (e.g., browser). For example, a user can log-in to content sharing platform 120 using user account information. Responsive to authorizing the user account, the content sharing platform 120 can send a cookie to client device 110. Client device 110, via token module 114, can generate the session-based authentication token based on the cookie. Client device 110 can include the session-based authentication token in the content requests to content sharing platform 120. In some embodiments, the cookie can include a key-value pair that includes an encrypted version of the account information.

A content-based authentication token can be an authentication token generated using data associated with digital media item requested by the user. For example, the content-based authentication token can be generated using a digital media item identification and a hashing algorithm. As compared to the session-based authentication token, a new content-based authentication token can be generated for each digital media item request based on, for example, a content identifier associated with each respective digital media item, whereas the same session-based authentication token can be used for each digital media item request. As will be explained in detail below, the content identifier may not be known to client device 110 until the playback process is initiated by content sharing platform 120. However, the session-based authentication token can be generated in advance of any playback. Thus, client device 110 can use the session-based authentication token to initiate the playback, then use the content-based authentication token generated during consumption of the initial playback to continue and/or prevent termination of the playback.

In some embodiments, for a content request, client device 110 can send the initial content request, to content sharing platform 120, along with the session-based authentication token. Content sharing platform 120 can then authenticate the session-based authentication token, create a playback event for the content request and associate the content request with a playback event identifier. Content sharing platform 120 can also instruct CDN 130 to provide client device 110 with an initial playback of the requested content. Content sharing platform 120 can further instruct CDN 130 to require client device 110 to send, to CDN 130, the content-based authentication token along with each additional request for continuing playback of the requested content. This enables content sharing platform 120 to receive an authentication token such as the session-based authentication token prior to allowing client device 110 to consume the initial playback of the requested content, and for CDN 130 to receive a relatively stronger authentication token such as the content-based authentication token prior to allowing client device 110 to consume the remaining playback of the requested content, as will be discussed in greater detail below.

In some embodiments, content sharing platform 120, proxy server 140 and/or server machines 132A-132Z may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to media items or provide the media items to the user. For example, content sharing platform 120 may allow a user to consume, upload, search for, approve of ("like"), disapprove of ("dislike"), or comment on media items.

Content sharing platform 120 may also include a web site (e.g., a webpage) or application back-end software that may be used to provide a user with access to the media items.

In some embodiments of the disclosure, a "user" may be represented as a single individual. However, other embodiments of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 can include multiple channels (e.g., channels A through Z, of which only channel A is shown in FIG. 1). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, content sharing platform 120 or other social networks can insert recommended content items into the user's syndicated feed, or may insert content items associated with a related connection of the user in the syndicated feed.

Each channel may include one or more media items 122. Examples of a media item 122 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some embodiments, media item 122 is also referred to as content or a content item.

For brevity and simplicity, rather than limitation, a video item, audio item, or gaming item are used as an example of a media item 122 throughout this document. As used herein, "media," media item," "online media item," "digital media," "digital media item," "content," and "content item" can include an electronic file that can be executed or loaded using software, firmware or hardware configured to present the digital media item to an entity. In one embodiment, content sharing platform 120 may store the media items 122 using the data store 106. In another embodiment, content sharing platform 120 can store video items or fingerprints as electronic files in one or more formats using data store 106.

In some embodiments, media items 122 are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In some embodiments, the media item can be streamed, such as in a live stream to one or more of client devices 110A-110Z. It is be noted that "streamed" or "streaming" refers to a transmission or broadcast of content, such as a media item, where the received portions of the media item may be played back by a receiving device immediately upon receipt (within technological limitations) or while other portions of the media content are being delivered, and without the entire media item having been received by the receiving device. "Stream" may refer to content, such as a media item, that is streamed or streaming. A live-stream media item may refer to a live broadcast or transmission of a live event, where the media item is concurrently transmitted, at least in part, as the event occurs to a receiving device, and where the media item is not available in its entirety.

In some embodiments, content sharing platform 120 can allow users to create, share, view or use playlists containing media items (e.g., playlist A-Z, containing media items 122). A playlist refers to a collection of media items that are configured to play one after another in a particular order without any user interaction. In some embodiments, content sharing platform 120 may maintain the playlist on behalf of a user. In some embodiments, the playlist feature of the content sharing platform 120 allows users to group their favorite media items together in a single location for playback. In embodiments, content sharing platform 120 may send a media item on a playlist to client device 110 for playback or display. For example, media viewer 112 may be used to play the media items on a playlist in the order in which the media items are listed on the playlist. In another example, a user can transition between media items on a playlist. In yet another example, a user can wait for the next media item on the playlist to play or can select a particular media item in the playlist for playback.

In some embodiments, the user can access content on sharing platform 120 through a user account. The user can access (e.g., log in to) the user account by providing user account information (e.g., username and password) via an application on client device 110 (e.g., media viewer 112). In some embodiments, the user account may be associated with a single user. In other embodiments, the user account can be a shared account (e.g., family account shared by multiple users) (also referred to as "shared user account" herein). The shared account can have multiple user profiles, each associated with a different user. The multiple users can login to the shared account using the same account information or different account information. In some embodiments, the multiple users of the shared account may be differentiated based on the different user profiles of the shared account.

In some embodiments, an authorizing data service 124 (also referred to as a "core data service" or "authorizing data source" herein) can authorize a user account such that the user account is permitted to obtain requested content. In some embodiments, authorizing data service 124 can authorize a user account (e.g., client device associated with the user account) access to requested content, authorize delivery of the requested content to the client device, or both. Authorization of the user account to access the requested content can involve authorizing what content is accessed and who is permitted to access the content. Authorization of the delivery of the content can involve authorizing how the content is delivered.

In some embodiments, authorizing data service 124 can use user account information to authorize the user account. In some embodiments, an authentication token (e.g., a session-based authentication token, a content-based authentication token, etc.) associated with client device 110 or media player 112 can be used to authorize the user account and/or playback of requested content.

In some embodiments, authorizing data service 124 is part of content sharing platform 120. In some embodiments, authorizing data service 124 is not part of the content sharing platform 120 and is an external service, such as an authorizing service offered by a third-party.

As noted above, content distribution network (CDN) 130 can include one or more nodes, represented as server machines 132A-132Z (generally referred to as "server machine(s) 132" or "server(s) 132" herein). In embodiments, content distribution network 130 includes a geographically distributed network of servers that work together to provide fast delivery of content. The network of servers are geographically distributed to provide high availability and high performance by distributing content or services based, in some instances, on proximity to client devices 110. The closer a CDN server is to a client device 110, the faster the content can be delivered to the client device 110.

For example, different server machines 132A-132Z can be distributed geographically within a particular country or across different countries. User A using client device 110A located in the Great Britain can request to obtain content hosted by content sharing platform 120. The request can be received by authorizing data service 124 of content sharing platform 120 and the user account associated with user A can be authorized to obtain the requested content. Subsequent to authorization, content sharing platform 120 can send a resource locator, such as a uniform resource locator (URL), to the client device 110A. A resource locator can refer to a reference that specifies a location of a resource (e.g., content) on a computer network and a mechanism for retrieving the resource. The resource locator can direct the client device 110A to obtain the content from a server machine 132 of content distribution network 130 that is located geographically proximate to client device 110A. For example, the resource locator can direct the client device 110A to obtain the requested content from a particular server machine 132 of content distribution network 130 that is also located in Great Britain. In another example, another user B using client device 110B located in the west coast of the United States requests to obtain the same content as user A. The request can be received by authorizing data service 124 of content sharing platform 120 and the user account associated with user B can be authorized to obtain the requested content. Subsequent to authorization, content sharing platform 120 can send a resource locator to the client device 110B. The resource locator can direct the client device 110B to obtain the content from a server machine 132 of content distribution network 130 that is located geographically proximate to client device 110B. For example, the resource locator can direct the client device 110B to obtain the requested content from a server machine 132 of content distribution network 130 located at the west coast of the United States.

In some embodiments, content distribution network 130 is part of content sharing platform 120. In other embodiments, the content distribution network 130 is a third-party platform that provides CDN services to content sharing platform 120. In other embodiments, some of content distribution network 130 can be operated by content sharing platform 120 and another part of content distribution network 130 can be operated by a third-party. In embodiments, content distribution network 130 includes a data store, such as data store 134. Data store 134 can be similar to data store 106. Data store can include data files 136 for content, such as media content. Data store 106 can also include one or more cryptographic keys 137, such as one or more public keys or one or more private keys.

Authorization module 138 can be included in server 132 of CDN 130. Authorization module 138 can perform aspects of the disclosure described herein. For example, authorization module 138 can authenticate the session-based authentication token and/or the content-based authentication token received from client device 110. In some embodiments, authorization module 138 can use decryption keys and/or libraries to authenticate the session-based authentication token and/or the content-based authentication token received from client device 110. Upon authenticating, authorization module 138 can indicate to authorizing data service 124 and/or server 132 whether to release resource locators and/or initiate playback to client device 110.

Proxy server 140 can include one or more nodes (e.g., servers) capable of implementing a protocol for improving playback startup latency. Proxy server 140 can include initial playback module 142. In some embodiments, proxy server 140, via initial playback module 142, can enable client 110 to receive a predetermined amount of playback data (e.g., initial playback) prior to generating the content-based authentication token. In some embodiments, proxy server 140 is part of content sharing platform 120 and/or content distribution network 130. In other embodiments, proxy server 140 is a third-party platform that provides initial playback services to client 110. In some embodiments, proxy server 140 is part of client device 110. Function associated with proxy server 140 will be explained in detail below.

In general, functions described in one embodiment as being performed by the content sharing platform 120, content distribution network 130, and or proxy server 140 can also be performed on the client devices 110A through 110Z in other embodiments, if appropriate. In addition, the functionality attributed to a particular component can be performed by different or multiple components operating together. The content sharing platform 120, content distribution network 130, or proxy server 140 can also be accessed as a service provided to other systems or devices through appropriate application programming interfaces, and thus is not limited to use in web sites.

Although embodiments of the disclosure are discussed in terms of content sharing platforms and promoting social network sharing of a content item on the content sharing platform 120, embodiments may also be generally applied to any type of social network providing connections between users, or content delivery platform. Implementations of the disclosure are not limited to content sharing platforms that provide channel subscriptions to users.

Further to the descriptions above, a user may be provided with controls allowing the user to make an election as to both if and when systems, programs, or features described herein may enable collection of user information (e.g., information about a user's social network, social actions or activities, profession, a user's preferences, or a user's current location), and if the user is sent content or communications a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provide to the user.

Figure 2:
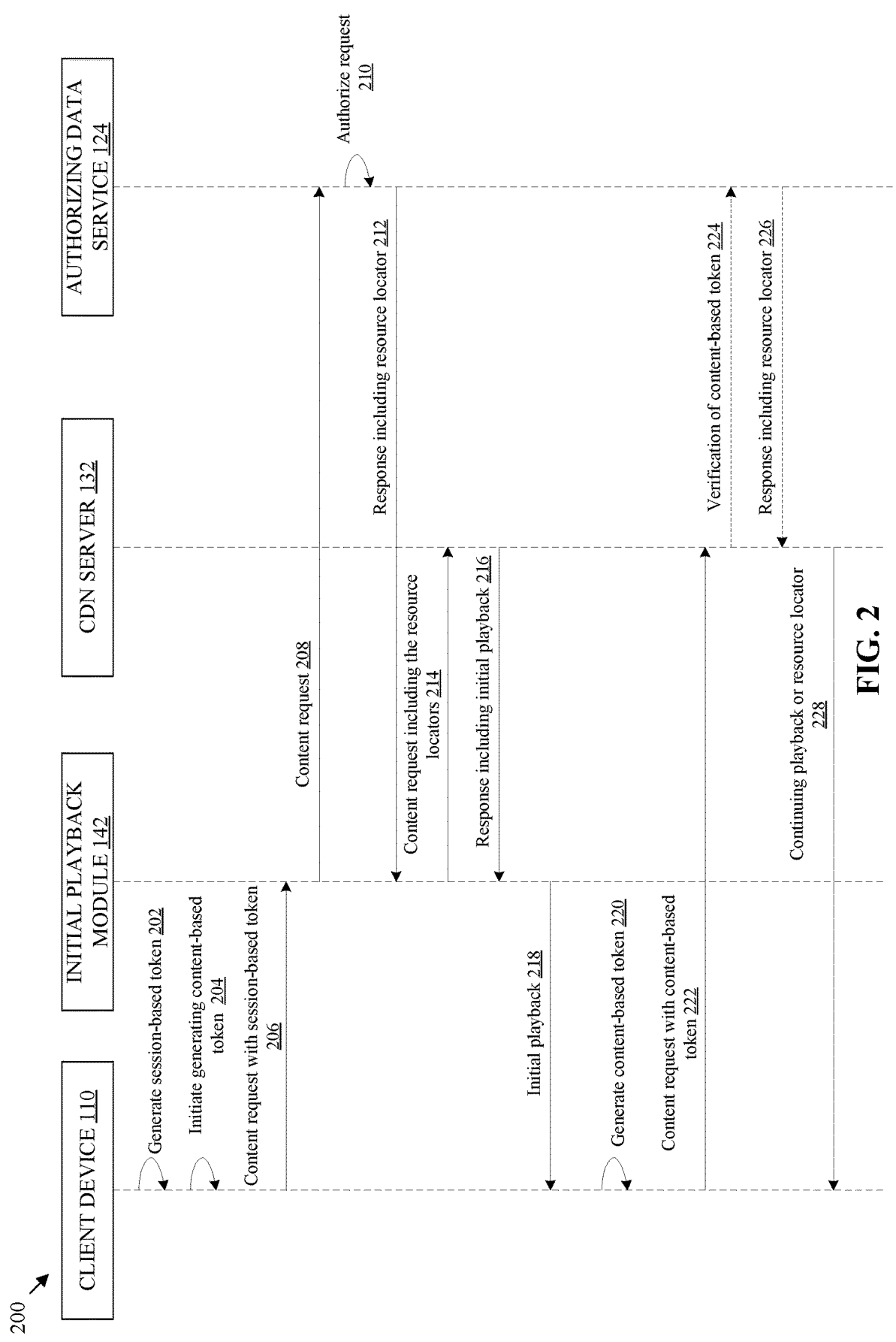
FIG. 2 is a diagram of operations for enabling initial playback of content while generating a content-based authentication token to be used to enable the remaining playback of content, in accordance with embodiments of the disclosure.

FIG. 2 is a diagram of operations for enabling initial playback of content while generating a content-based authentication token to be used to enable the remaining playback of content, in accordance with embodiments of the disclosure. System 200 may include similar components as system architecture 100 of FIG. 1. It may be noted that components of FIG. 1 may be used to help describe FIG. 2. For purposes of illustration, rather than limitation, operations with respect to system 200 are described as performed by authorizing data service 124 of content sharing platform 120, server 132 of CDN 130, initial playback module 142 of proxy server 140, or client device 110 may be performed by any component thereof, unless otherwise described. The operations described with respect to FIG. 2 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

At operation 202, client device 110 generates a session-based authentication token. In some embodiments, the session-based authentication token can be generated using cookies associated with client device 110. For example, a user can log-in to content sharing platform 120 using user account information and, responsive to content sharing platform 120 authorizing the user account, the content sharing platform 120 can send a cookie to user device 120. Client device 110, via token module 114, can then generate the session-based authentication token based on the cookie. In other embodiments, the session-based token can be generated using other data associated with the user or a user account (e.g., user name and password, internet protocol (IP) address, etc.)

At operation 204, responsive to a user request for content, client device 110 initiates generation of a content-based authentication token. The content-based authentication token can be generated using, for example, information derived from a previous (cached) playback event, an application that issued a content request, and a content identifier that identifies the requested content. For example, a user of client device 110 can request to play a video item that is hosted by content sharing platform 120 using an application, such as a browser or native application. Upon the user request for the video item, the client device 110 can retrieve initial information identifying the video item and initiate the generation of the content-based authentication token. In some embodiments, the initial identifying information can be retrieved from data loaded into the GUI of client device 110. For example, the user can load a webpage displaying a video item and a button to initiate playback (play button). The webpage can include initial information identifying of the video item. Responsive to the user requesting playback of the video item (e.g., selecting the play button), client device 110 can initiate generation of the content-based authentication token using the initial identifying information from the data loaded into the GUI. In some embodiments, client device 110 can start generating the content-based authentication token using data other than the content identifier and subsequently use the content identifier. That is, the content identifier can be provided by authorizing data service 124 after the request for content is sent or can be derived, by client device 110, from the initial portion of the requested content that is received by client device 110. For example, client device 110 can send a request to obtain content (operation 206, discussed below), and the content identifier can be included in the response to the request for content or be derived from the initial portion of the requested content that is received by client device 110.

As compared to the session-based authentication token, the content-based authentication token is a stronger authentication token, which requires a content identifier that is not known immediately, thereby resulting in a delayed generation process. As such, client device 110 can use the session-based authentication token (which can be generated without any delay and in advance of content playback) to obtain the initial playback of the requested content from CDN network 130, and use the content-based authentication token to obtain the remainder of the playback. The initial playback can include only the first portion of the video item (e.g., the first 5 seconds of the video). Enabling the session-based token to obtain only the first portion of a video item provides protection against content requests that do not start at the beginning of the video. In particular, this prevents an unauthorized user from generating a valid session-based authentication token, and requesting the entirety of a video item in portions (e.g., a first 5 second portion from the start of the video item, a second 5 second portion from the 5 second mark of the video item, and so forth), and combining the portions into a single video.

At operation 206, client device 110 can send a request to obtain content to initial playback module 142 of proxy server 140. In some embodiments, the request from client device 110 can include the format of the data to be received. For instance, the request can include a format of the video item that is compatible with the media viewer 112 at the client device 110. In some embodiments, the request can include additional information (e.g., type, version, etc.) pertaining to the media viewer 112 that provides playback of the content, such as a video item.

In some embodiments, the content request can include the session-based authentication token generated at operation 202. In other embodiments, in lieu of the session-based authentication token, the content request can include identifiers of the client device, user, or user account attempting to obtain the content. For example, the user request can identify a username and password associated with the user account requesting to obtain the content. In another example, the request can include a cookie that identifies the client device 110 or application at the user device, which can be used to identify a particular user account. At operation 208, proxy server 140 can forward (send) the content request, along with the session-based authentication token (and/or other identifiers of the client device, user, or user account attempting to obtain the content), to authorizing data service 124. Upon receiving the content request, authorizing data service 124 of content sharing platform 120 can create a playback event and associate a playback event identifier with the content request.

At operation 210, authorizing data service 124 of content sharing platform 120 can authorize the content request. To authorize the request, authorizing data service 124 can authenticate the session-based authentication token using, for example, an authentication process. For example, performing the authentication process can include decrypting the session-based authentication token, determining a cryptographic signature of the session-based authentication token, inspecting a spam bit of the session-based token, and/or performing any other process associated with authenticating the session-based authentication token.

In other embodiments, authorizing data service 124 can determine that at least one of the client device 110, user, or user account, is permitted to obtain the content. In some embodiments, the request can identify the account information of the user account requesting to obtain the content. For example, the account information can be encrypted in a cookie. In another example, the account information can be input by the user and provided in the request. In some embodiments, the account information, such as the username and password, can be authenticated by the authorizing data service 124 by comparing the account information (e.g., received username and password) with a stored record of the account information. If the account information of the request matches the account information of the record, the authorizing data service 124 can determine that the particular user account is authenticated.

In some embodiments, responsive to the authorizing data service 124 failing to authenticate the session-based authentication token (or the identifiers), the content request can be denied by content sharing platform 120. In some embodiments, if the authorizing data service 124 does not authorize the request to obtain the content, the authorizing data service 124 can send a message to client device 110 indicating that authorization is not granted to obtain the requested content. In some embodiments, responsive to the authorizing data service 124 not authorizing the request to obtain the content, the content sharing platform 120 can send a message to client device 110 requesting a new session-based authentication token or new log-in information and/or additional information.

In some embodiments, responsive to either the detecting of one or more parameters (e.g., parameters related to a user account, client device location, IP address, etc.) processed during the authentication process of the session-based token or failing to authenticate the session-based authentication token (or the identifiers), authorizing data service 124 can initiate one or more actions. The actions can include applying a Digital Rights Management (DRM) restriction (e.g., require client device 110 to be provided with a DRM playback using CDN generated encryption), requesting a ReCaptcha verification from client device 110, requesting the user of client device 110 to sign in, instructing server 132 to throttle the playback of the requested content, requiring validation of a content-based authentication token by server 132 where server 132 is instructed to reject requests for the remainder of the video item ("continuing playback") in response to the content-based token failing a verification process, requiring validation of a content-based authentication token by server 132 where server 132 is instructed to throttle requests for continuing playback in response to the content-based authentication token failing a verification process, and rejecting the content request. In other embodiments, responsive to authenticating the session-based authentication token or the client device, the user, or the user account, authorizing data service 124 can allow playback of the entire content without any restrictions.

In some embodiments, responsive to the authorizing data service 124 authorizing the request to obtain the content, the authorizing data service 124 generates one or more resource locators (e.g., URLs) to authorize the client device 110 to obtain the initial playback of the requested content from CDN network 130. In some embodiments, the resource locators can identify the server of CDN 130 that is to deliver the requested content to the client device 110. For example, the resource locators can include a hostname, which identifies the particular server (e.g., server 112A, server 112B, etc.) that can be accessed to obtain the initial playback of the requested content. In some embodiments, the authorizing data service 124 can append the resource locator with one or more cryptographically signed parameters (e.g., expiration parameter, bit rate parameter, event identifier parameter, etc.), which can be used to indicate to server 132 which data is to be served and how the data is to be served. In some embodiments, the cryptographically signed parameters can indicate to server 132 to provide client device 110 with only the initial playback of the requested content (e.g., a predetermined amount of the requested content). For example, the initial playback can include the initial 5 seconds of the video item associated with the requested content that can be provided using a single resource locator. The cryptographically signed parameters can further indicate to server 132 that each additional request for continuing playback (the remainder of the desired content using, for example, additional resource locators) is to include the content-based authentication token.

At operation 212, responsive to the user account being authorized, authorizing data service 124 can send a response to the request for content (e.g., operation 208) to initial playback module 142. In some embodiments, the response can include the one or more resource locators that identifies server 132 of CDN 130 that is to deliver the content to the client device 110, and the playback event identifier. In some embodiments, the response can also include the one or more cryptographically signed parameters that indicate to server 132 to provide client device 110 with only the initial playback of the requested content. In some embodiments, the response can also include a playback event identifier and/or user account information. In some embodiments, the resource locator can be included in a HyperText Transfer Protocol (HTTP) response. In some embodiments, authorizing data service 124 can encrypt the response. In some embodiments, the response can include one or more decryption keys. The decryption keys can be used to decrypt the response and/or the content associated with the resource locators.

At operation 214, initial playback module 142 can request the content using the resource locator appended with the cryptographically signed parameters. For example, initial playback module 142 can send an HTTP request using the resource locator(s). In some embodiments, the request can be sent to server 132 of the CDN 130. In some embodiments, server 132 of CDN 130 receives the request from initial playback module 142. The request includes the resource locator appended with the cryptographically signed parameters as described above.

At operation 216, server 132 can respond to the request from initial playback module 142 with data associated with the initial playback, as instructed by the cryptographically signed parameters. For example, the response can include a portion (e.g., the first 5 seconds) of the video item. The initial playback can be obtained using a single resource locator. At operation 218, the proxy server can send the initial playback data to client device 110 for user consumption. In some embodiments, responsive to the initial playback data being encrypted, initial playback module 142 can decrypt the initial playback data.

At operation 220, client device 110 can finish generating the content-based authentication token.

At operation 222, client device 110 can send a request for the remainder of the video item ("continuing playback") to server 132. The request can include the content-based authentication token. The request can identify the content requested using, for example, the playback event identifier and/or location identifier. The location identifier can indicate the location (e.g., time point) within the video item from which the playback is to continue. In some embodiments, the request from client device 110 to the server 132 can include the format of the data to be received.

Server 132 can authenticate the content-based authentication token locally or alternatively (at operation 224), server 132 can send the content-based authentication token to authorizing data service 124 for authentication. Authorizing data service 124 can then authenticate the content-based authentication token using, for example, an authentication process. For example, authorizing data service 124 can decrypt the content-based token, determine a cryptographic signature of the content-based token, inspect a spam bit of the authentication content-based token, and/or perform any other process associated with authenticating the content-based authentication token.

In some embodiments, responsive to the authorizing data service 124 authorizing the request to obtain the continuing playback, the authorizing data service 124 can generate or obtain a resource locator to authorize the client device 110 to obtain the continuing playback of the requested content from server 132.

Responsive to the authorizing data service 124 of content sharing platform 120 authenticating the content-based authentication token, the authorizing data service 124 can (at optional operation 226), send a response, to server 132, including a resource locator associated with the continuing playback (and the playback event identifier). In other embodiments, authorizing data service 124 can send the resource locators for the requested content at operation 212 (each appended with the cryptographically signed parameters), and indicate to server 132, in the response, that the content-based token was verified. At operation 228, server 132 can respond to the content request of operation 222 with data associated with the continuing playback or send the resource locator of the continuing playback to client device 110. The client device 110 can then use the resource locator to request the continuing playback from server 132. The continuing playback can include another portion of the video item (e.g., the next 5 second, the next 10 seconds, etc.).

In some embodiments, the CDN 130 can perform all or part of the verification of the content-based token using, for example, authorization module 138. For example, authorization module 138 can use decryption keys and libraries to verify the content-based authentication token. Accordingly, CDN 130 would not require authorizing data service 124 to perform the authentication process on the content-based authentication token, as discussed in relation to optional operations 224 and 226.

In some embodiments, CDN 130 can require each additional request from client device 110 for continuing playback to be accompanied with the content-based authentication token. In some embodiments, rather than requiring the content-based authentication token for each additional content request, server 132 can require the session-based authentication token instead. For example, at operation 222, client device 110 can send a request for the remainder of the video item ("continuing playback") to server 132, where the request can include the session-based authentication token. Responsive to receiving the request and authenticating the session-based authentication token, server 132 can respond to the request with data associated with the continuing playback or send the resource locator of the continuing playback to client device 110.

In some embodiments, once the content-based authentication token is authenticated, content sharing platform 120 and/or CDN 130 do not need to re-authenticate the content-based authentication token for any additional requests from client device 110 for continuing playback. Client device can continue sending requests for the desired content, where each request is accompanied by the content-based authentication token (and the playback event identifier), until the entire content is consumed by the user. In some embodiments, server 132 can reject a request of client device 110 for continuing playback when the request is without the content-based token (or with an invalid and/or unauthenticated content-based token). In some embodiments, responsive to receiving a request without a content-based authentication token or a request with an invalid content-based authentication token, content sharing platform 120 and/or the CDN 130 can impose one or more enforcement actions upon client device 110. For example, content sharing platform 120 and/or the CDN 130 can apply strict bandwidth limits upon client device 110, reduce the playback quality, apply a DRM restriction, request a ReCaptcha verification, request the user of client device 110 to sign in, etc.

In some embodiments, server 132 (and/or authorizing data service 124) can track the status of the playback event using a status tracking table. In particular, server 132 can track the status of every ongoing playback event via their respective playback event identifier. The status tracking table can indicate for each playback event identifier whether the content-based authentication token has been verified, is pending verification, or failed verification. Server 132 can further log into the status tracking table all outstanding requests for continuing playback where the content-based authentication token is still pending verification. Upon verification, server 132 can release the continuing playback event. Server 132 can further, in response to an expiration parameter indicating an expiration for the use of the resource locator, remove the corresponding playback event identifier from the status tracking table. In some embodiments, server 132 can remove the playback event identifier from the status tracking table using other methods, such as cache replacement policies (e.g., first in-first out, least recently used, etc.).

Figure 3:
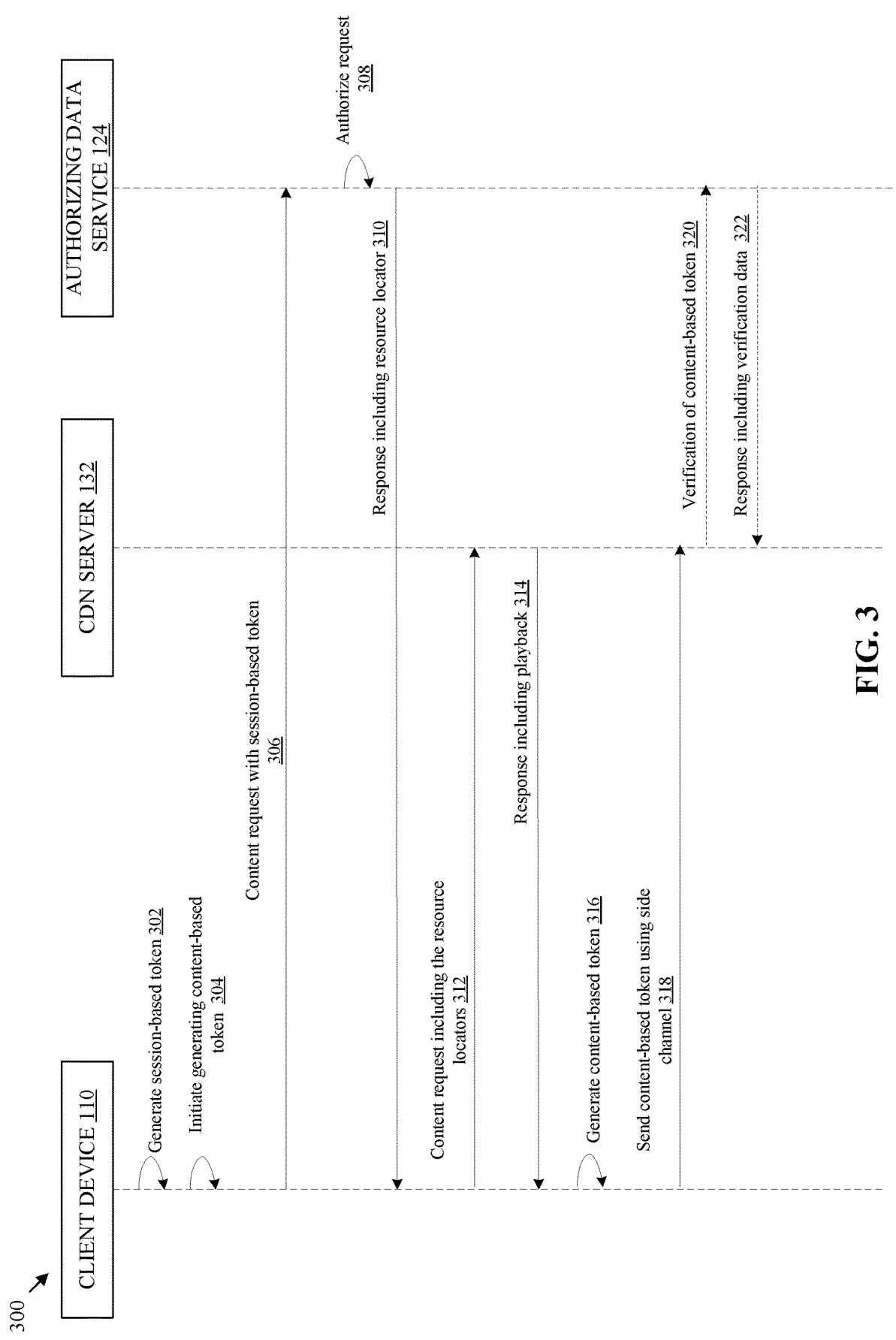
FIG. 3 is a diagram of operations for initiating playback of content while generating a content-based authentication token to be used to enable continuation of the playback, in accordance with embodiments of the disclosure.

FIG. 3 is a diagram of operations for initiating playback of content while generating a content-based authentication token to be used to enable continuation of the playback, in accordance with embodiments of the disclosure. System 300 may include similar components as system architecture 100 of FIG. 1. It may be noted that components of FIG. 1 may be used to help describe FIG. 3. For purposes of illustration, rather than limitation, operations with respect to system 300 are described as performed by authorizing data service 124 of content sharing platform 120, server machine 132 of content distribution network 130, or client device 110 may be performed by any component thereof, unless otherwise described. The operations described with respect to FIG. 3 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

At operation 302, client device 110 generates a session-based authentication token. In some embodiments, the session-based authentication token can be generated using cookies associated with client device 110. For example, a user can log-in to content sharing platform 120 using user account information and, responsive to content sharing platform 120 authorizing the user account, the content sharing platform 120 can send a cookie to user device 120. Client device 110, via token module 114, can then generate the session-based authentication token based on the cookie. In other embodiments, the session-based authentication token can be generated using other data associated with the user or a user account (e.g., user name and password, internet protocol (IP) address, etc.).

At operation 304, responsive to a user request for content, client device 110 initiates generation of a content-based authentication token. The content-based authentication token can be generated using, for example, information derived from a previous (cached) playback event, an application that issued a content request, and a content identifier that identifies the requested content. For example, a user of client device 110 can request to play a video item that is hosted by content sharing platform 120 using an application, such as a browser or native application. Upon the user request for the video item, the client device 110 can retrieve initial information identifying the video item and initiate the generation of the content-based authentication token (e.g., by applying a hashing algorithm to the identifying information). In some embodiments, the initial identifying can be retrieved from data loaded into the GUI of client device 110. For example, the user can load a webpage displaying a video item and a button to initiate playback (play button). The webpage can include initial information identifying of the video item. Responsive to the user requesting playback of the video item (e.g., selecting the play button), client device 110 can initiate generation of the content-based authentication token using initial identifying information from the data loaded into the GUI. In some embodiments, client device 110 can start generating the content-based authentication token using data other than the content identifier and subsequently use the content identifier. That is, the content identifier can be provided by authorizing data service 124 after the request for content is sent or can be derived, by client device 110, from the initial portion of the requested content that is received by client device 110. For example, client device 110 can send a request to obtain content (operation 306, discussed below), and the content identifier can be included in the response to the request for content or be derived from the initial portion of the requested content that is received by client device 110. In one example, generating the content-based token can require a few seconds.

At operation 306, client device 110 can send a request to obtain content to authorizing data service 124. In some embodiments, the request from client device 110 can include the format of the data to be received. For instance, the request can include a format of the video item that is compatible with the media viewer 112 at the client device 110. In some embodiments, the request can include additional information (e.g., type, version, etc.) pertaining to the media viewer 112 that provides playback of the content, such as a video item.

In some embodiments, the content request can include the session-based authentication token generated at operation 302. In other embodiments, in lieu of the session-authentication based token, the content request can include identifiers of client device 110, user, or user account attempting to obtain the content. For example, the user request can identify a username and password associated with the user account requesting to obtain the content. In another example, the request can include a cookie that identifies the client device 110 or application at the user device, which can be used to identify a particular user account. Upon receiving the content request, authorizing data service 124 of content sharing platform 120 can create a playback event and associate a playback event identifier with the content request.

At operation 308, authorizing data service 124 of content sharing platform 120 can authorize the content request. To authorize the request, authorizing data service 124 can authenticate the session-based authentication token using, for example, an authentication process. For example, performing the authentication process can include decrypting the session-based token, determining a cryptographic signature of the session-based token, inspecting a spam bit of the session-based token, and/or performing any other process associated with authenticating the session-based token.

In other embodiments, authorizing data service 124 can determine that at least one of the client device 110, user, or user account, is permitted to obtain the content. In some embodiments, the request can identify the account information of the user account requesting to obtain the content. For example, the account information can be encrypted in a cookie. In another example, the account information can be input by the user and provided in the request. In some embodiments, the account information, such as the username and password, can be authenticated by the authorizing data service 124 by comparing the account information (e.g., received username and password) with a stored record of the account information. If the account information of the request matches the account information of the record, the authorizing data service 124 can determine that the particular user account is authenticated.

In some embodiments, responsive to the authorizing data service 124 failing to authenticate the session-based authentication token (or the identifiers), the content request can be denied by content sharing platform 120. In some embodiments, if the authorizing data service 124 does not authorize the request to obtain the content, the authorizing data service 124 can send a message to client device 110 indicating that authorization is not granted to obtain the requested content.

In some embodiments, responsive to the authorizing data service 124 not authorize the request to obtain the content, the content sharing platform 120 can send a message to client device 110 requesting a new session-based authentication token or new log-in information and/or additional information.

In some embodiments, responsive to either the detecting of one or more parameters (e.g., parameters related to a user account, client device location, IP address, etc.) processed during the authentication process of the session-based authentication token or failing to authenticate the authentication session-based token (or the identifiers), authorizing data service 124 can initiate one or more actions. The actions can include applying a Digital Rights Management (DRM) restriction (e.g., require client device 110 to be provided with a DRM playback using CDN generated encryption), requesting a ReCaptcha verification from client device 110, requesting the user of client device 110 to sign in, instructing server 132 to throttle the playback of the requested content, requiring validation of a content-based token by server 132 where server 132 is instructed to reject requests for the remainder of the video item ("continuing playback") in response to the content-based token failing a verification process, requiring validation of a content-based token by server 132 where server 132 is instructed to throttle requests for continuing playback in response to the content-based token failing a verification process, and rejecting the content request. In other embodiments, responsive to authenticating the session-based authentication token or the client device, the user, or the user account, authorizing data service 124 can allow playback of the entire content without any restrictions.

In some embodiments, responsive to the authorizing data service 124 authorizing the request to obtain the content, the authorizing data service 124 generates a resource locator to authorize the client device 110 to obtain the playback of the requested content from CDN 130. In some embodiments, the resource locator (e.g., URL(s)) can identify the server of CDN 130 that is to deliver the requested content to the client device 110. For example, the resource locator can include a hostname, which identifies the particular server (e.g., server 112A, server 112B, etc.) that can be accessed to obtain the playback of the requested content. In some embodiments, the authorizing data service 124 can append the resource locator with one or more cryptographically signed parameters that can be used to indicate to the CDN 130 to provide client device 110 with playback of the requested content for a predetermined amount of time (e.g., 5 seconds). The parameters can further indicate to the CDN 130 to terminate the playback to client device 110, in response to failing to receive or authenticate a content-based token from client device 110.

At operation 310, responsive to the user account being authorized, authorizing data service 124 can send a response to the request for content (e.g., operation 306) to client device 110. In some embodiments, the response can include the resource locator that identifies server 132 of CDN 130 that is to deliver the content to the client device 110, and the playback event identifier. In some embodiments, the response can also include one or more cryptographically signed parameters that indicate to server 132 to provide client device 110 with playback of the requested content for a predetermined time period, and to terminate the playback if server 132 fails to receive a content-based authentication token within said time period. In some embodiments, the response can also include a playback event identifier and/or user account information. In some embodiments, the resource locator can be included in a HyperText Transfer Protocol (HTTP) response. In some embodiments, authorizing data service 124 can encrypt the response. In some embodiments, the response can include one or more decryption keys. The decryption keys can be used to decrypt the response and/or the content associated with the resource locators.

At operation 312, client device 110 can request the content using the resource locator appended with the cryptographically signed parameter. For example, client device 110 can send an HTTP request using the resource locator. In some embodiments, the request can be sent to server 132. In some embodiments, server 132 receives the request from client device 110. The request includes the resource locator appended with the cryptographically signed parameter as described above.

At operation 314, server 132 can respond to the request from client device 110 with data associated with the playback, as instructed by the cryptographically signed parameter. For example, the response can include the requested video item. At operation 316, client device 110 can finish generating the content-based authentication token.

At operation 318, client device 110 can send the content-based authentication token to server 132. In some embodiments, the content-based authentication token can be sent using a side channel. For example, a primary channel of client device 110 can be used for receiving the playback from server 132, and a side channel (e.g., a separate communication channel, a different port, etc.) can be used by client device 110 to send the content-based authentication token to server 132.

Server 132 can authenticate the content-based authentication token locally or alternatively (at optional operation 320), server 132 can send the content-based authentication token to authorizing data service 124 for authentication. Authorizing data service 124 can then authenticate the content-based authentication token using, for example, an authentication process. For example, authorizing data service 124 can decrypt the content-based authentication token, determine a cryptographic signature of the content-based token, inspect a spam bit of the content-based authentication token, and/or perform any other process associated with authenticating the content-based authentication token.

Responsive to the authorizing data service 124 of content sharing platform 120 authenticating the content-based authentication token, the authorizing data service 124 can (at optional operation 322), send a response, to server 132, verifying the authenticity of content-based authentication token. Responsive to the content-based token being authentic, server 132 can continue providing playback to client device 110. Responsive to the content-based authentication token being invalid, server 132 can terminate the playback to client device 110.

In some embodiments, the CDN 130 can perform all or part of the verification of the content-based authentication token using, for example, authorization module 138. For example, authorization module 138 can use decryption keys and libraries to verify the content-based authentication token. In some embodiments, responsive to failing to receive the content-based authentication token or receiving an invalid content-based authentication token, content sharing platform 120 and/or the CDN 130 can impose one or more enforcement actions upon client device 110. For example, content sharing platform 120 and/or the CDN 130 can apply strict bandwidth limits upon client device 110, reduce the playback quality, apply a digital rights management (DRM)

restriction, request a ReCaptcha verification, request the user of client device 110 to sign in, etc.

In some embodiments, server 132 (and/or authorizing data service 124) can track the status of the playback event using a status tracking table. In particular, server 132 can track the status of every ongoing playback event via their respective playback event identifier. The status tracking table can indicate for each playback event identifier whether the content-based authentication token has been verified, is pending verification, or failed verification. Server 132 can further log into the status tracking table all outstanding requests for continuing playback where the content-based authentication token is still pending verification. In some embodiments, server 132 can pause the playback after the predetermined time period for viewing the content expires until the content-based authentication token is received and/or verified. Upon verification, server 132 can resume the continuing playback event. Server 132 can further, in response to an expiration parameter indicating an expiration for the use of the resource locator, remove the corresponding playback event identifier from the status tracking table. In some embodiments, server 132 can remove the playback event identifier from the status tracking table using other methods, such as cache replacement policies (e.g., first in-first out, least recently used, etc.)

Figure 4:
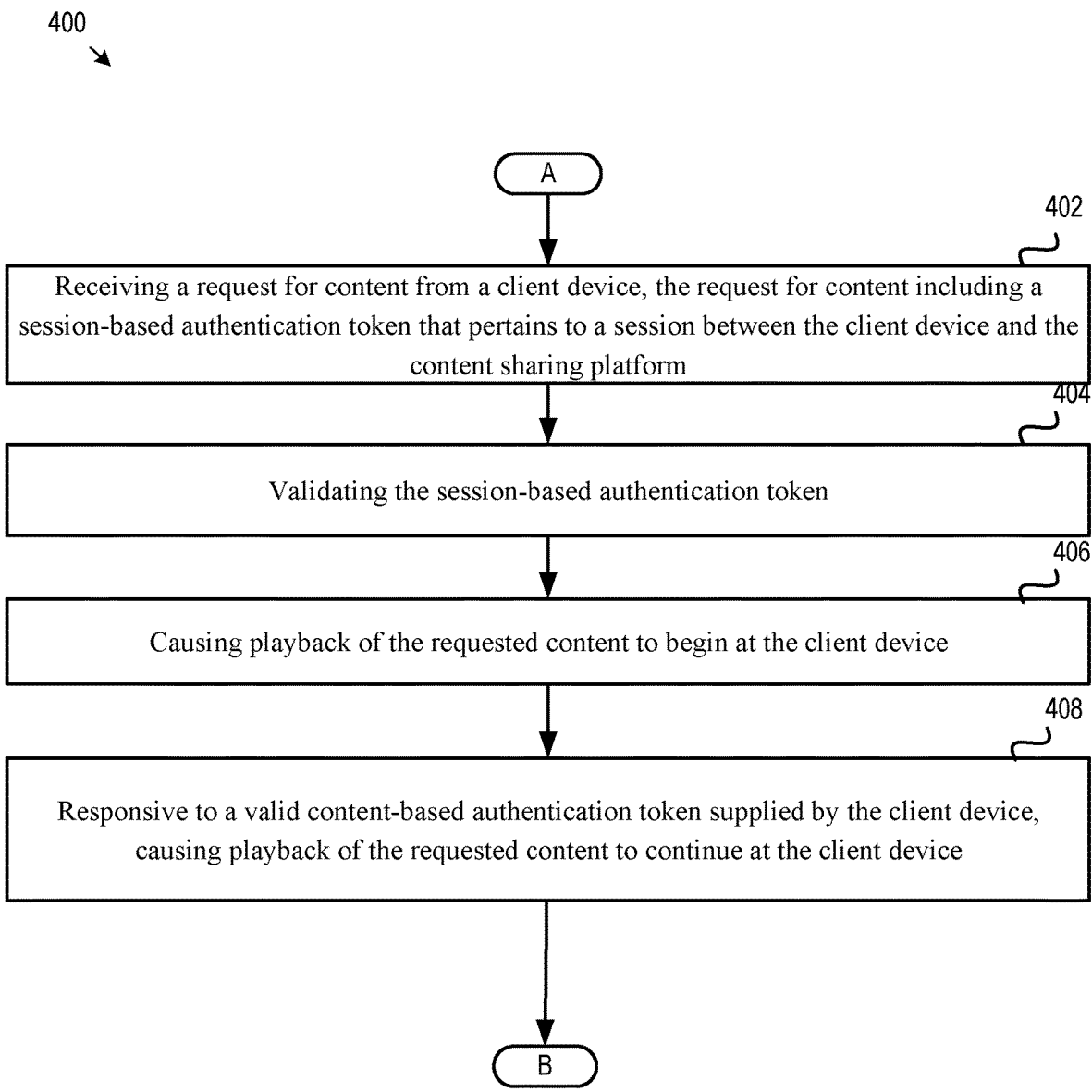
FIG. 4 depicts a flow diagram of a method for authorizing initial playback of content on a client device while awaiting a content-based authentication token to be used to enable the remaining playback, in accordance with embodiments of the disclosure.

FIG. 4 depicts a flow diagram of a method 400 for authorizing initial playback of content on a client device while awaiting a content-based authentication token to be used to enable the remaining playback, in accordance with embodiments of the disclosure. The method is performed by processing logic that may include hardware (circuitry, dedicated logic, etc.), software (e.g., instructions run on a processing device), or a combination thereof. In some embodiments, some or all the operations of method 400 may be performed by one or more components of system 100 of FIG. 1. In other embodiments, one or more operations of method 400 may be performed by the authorization module of content distribution network 130, the authorizing data service 124, or the initial playback module 142 as described with respect to FIG. 1-3. It may be noted that components described with respect FIG. 1-3 may be used to illustrate aspects of FIG. 4.

At block 402, processing logic implementing method 400 receives a request for content from a client device. The request for content can include a session-based authentication token that pertains to a session between the client device and the content sharing platform.

At block 404, the processing logic validates the session-based authentication token. For example, the processing logic can perform an authentication process that can include decrypting the session-based authentication token, determining a cryptographic signature of the session-based authentication token, inspecting a spam bit of the session-based token, and/or performing any other process associated with authenticating the session-based authentication token.

At block 406, the processing logic causes playback of the requested content to begin at the client device. In some embodiments, causing the playback of the requested content to begin can include, upon validating the session-based authentication token, associating the request for content with a playback event identifier of a playback event and generating a response associated with the playback event identifier. The response can include one or more resource locators to obtain the requested content, and a parameter authorizing playback of an initial portion of the requested content. The parameter can further indicate that a valid content-based authentication token is required for playback of an additional portion of the requested content. The response can also include the playback event identifier. In some embodiments, causing the playback of the requested content to begin can include, upon validating the session-based authentication token, providing an indication (or an instruction) to a CDN sever to begin providing/streaming an initial portion of the requested content to the client device, and providing a response associated with the playback event identifier to the client device. The response can include one or more resource locators to obtain the requested content (e.g., the remainder of the requested content), and the playback event identifier.

In some embodiments, the valid content-based authentication token can be generated by the client device based on the identifier of the requested content, an identifier of a client device application that issued the request for content, and data associated with a previous playback event initiated by the client device application. The playback of the requested content can begin at the client device before generation of the valid content-based authentication token is completed at the client device.

In some embodiments, the response includes multiple resource locators each used to obtain a respective additional portion of the requested content, and the parameter can indicate that the valid content-based authentication token is required to obtain each of the plurality of additional portions of the requested content.

In other embodiments, the response includes a single resource locator to obtain the requested content, and the parameter can indicate that the valid content-based authentication token is required to be received within a predetermined time period from the beginning of the playback of the requested content to avoid terminating the playback of the requested content and allow the playback of the additional portion of the requested content. Responsive to failing to receive the valid content-based authentication token, the processing logic can prevent the playback of the additional portion of the requested content.

In some embodiments, causing playback of the requested content to continue at the client device includes receiving the content-based authentication token supplied by the client device, validating the content-based authentication token, and notifying a CDN server (e.g., server 132) that the content-based authentication token is valid. In other embodiments, the content-based authentication token can be validated using authorization module 138 of CDN 130, or a third party service.

At block 408, responsive to a valid content-based authentication token supplied by the client device, the processing logic causes playback of the requested content to continue at the client device. The valid content-based authentication token can be based on an identifier of the requested content. In some embodiments, the identifier can be derived by the client device from the content sent to the client device. Alternatively, responsive to failing to receive the valid content-based authentication token, the playback of the additional portion of the requested content is prevented, as discussed in more details above.

Figure 5:
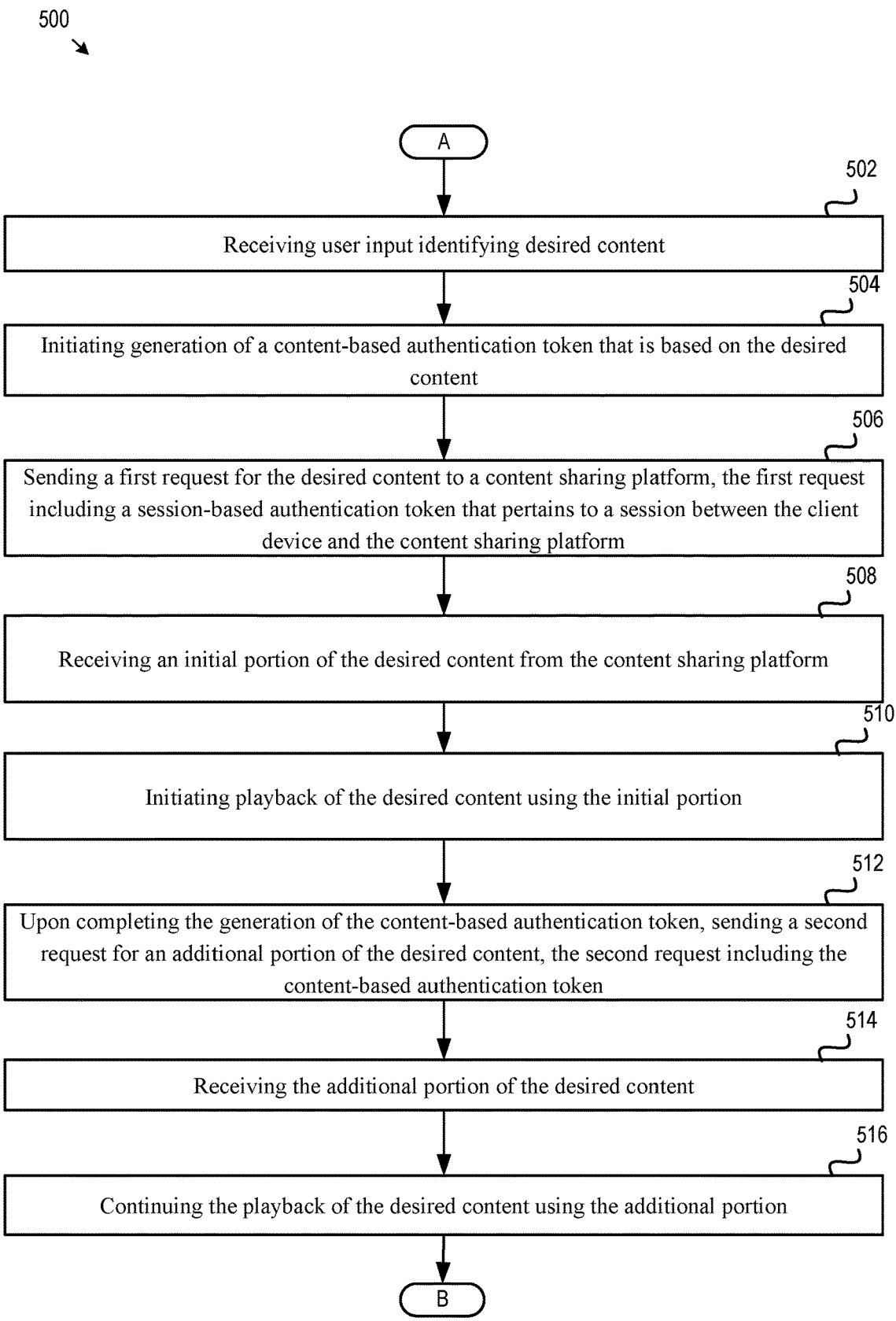
FIG. 5 depicts a flow diagram of a method for requesting playback while generating a content-based authentication token to be used to prevent termination of the playback, in accordance with embodiments of the disclosure.

FIG. 5 depicts a flow diagram of a method 500 for requesting playback while generating a content-based authentication token to be used to prevent termination of the playback, in accordance with embodiments of the disclosure. The method is performed by processing logic that may include hardware (circuitry, dedicated logic, etc.), software (e.g., instructions run on a processing device), or a combination thereof. In some embodiments, some or all the operations of method 500 may be performed by one or more components of system 100 of FIG. 1. In other embodiments, one or more operations of method 500 may be performed by an authorization module of content distribution network 130 and/or an authorizing data service 124 as described with respect to FIG. 1-3. It may be noted that components described with respect FIG. 1-3 may be used to illustrate aspects of FIG. 5

At block 502, processing logic implementing method 500 receives user input identifying desired content. For example, a user of a client device can request to play a video item or an audio item that is hosted by a content sharing platform using an application, such as a browser or native application.

At block 504, the processing logic initiates generation of a content-based authentication token that is based on the desired content. In some embodiments, the content-based authentication token can be generated by the processing logic based on an identifier of the desired content, an identifier of a client device application that issued the first request for the desired content, and/or data associated with a previous playback event initiated by the client device application.

At block 506, the processing logic sends a first request for the desired content to a content sharing platform. The first request can include a session-based authentication token that pertains to a session between the client device and the content sharing platform.

At block 508, the processing logic receives an initial portion of the desired content from the content sharing platform. In addition, in some embodiments, the processing logic can receive a response of the content sharing platform to the first request for the desired content. The response can include the playback event identifier of a playback event associated with the first request and one or more resource locators to obtain the desired content (e.g., the remainder of the requested content). In some embodiments, the response includes multiple resource locators, each used to obtain a respective portion of the desired content. In other embodiments, the response includes a single resource locator to obtain the desired content.

At block 510, the processing logic initiates playback of the desired content using the initial portion. The playback of the desired content can begin before the generation of the content-based authentication token is completed at the client device.

At block 512, the processing logic, upon completing the generation of the content-based authentication token, sends a second request for an additional portion of the desired content. The second request includes the content-based authentication token. In some embodiments, the second request for the additional portion includes a respective one of the resource locators. The second request can be repeatedly sent with the content-based authentication token and a respective resource locator to obtain more additional portions of the desired content.

In other embodiments, the response includes a single resource locator, and the second request is required to be sent with the content-based authentication token within a predetermined time period from beginning of the playback of the desired content to avoid termination of the playback of the desired content.

At block 514, the processing logic receives the additional portion of the desired content.

At block 516, the processing logic continues the playback of the desired content using the additional portion.

Figure 6:
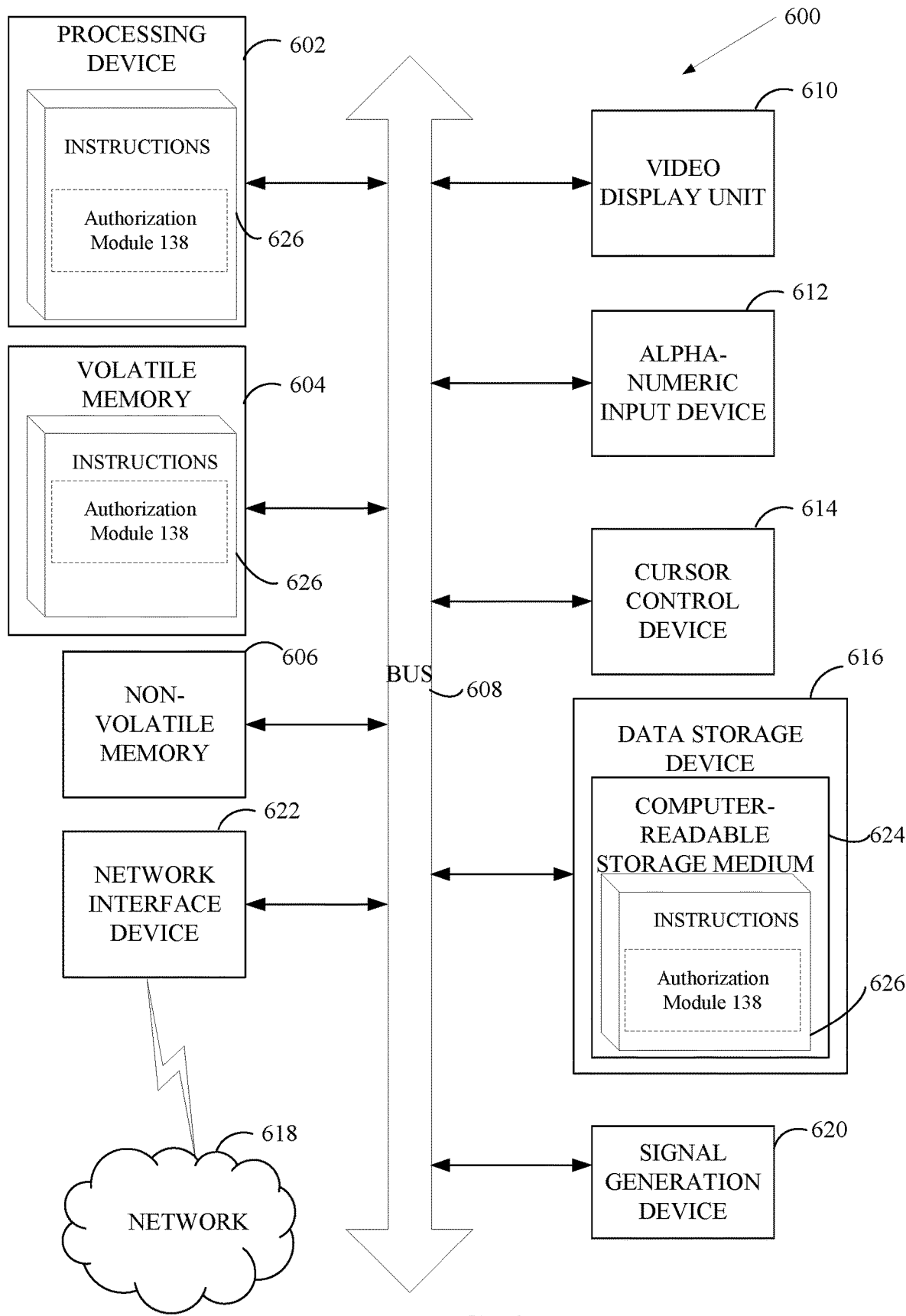
FIG. 6 is a block diagram illustrating an exemplary computer system, in accordance with an embodiment of the disclosure.

FIG. 6 is a block diagram illustrating an exemplary computer system 600, in accordance with an embodiment of the disclosure. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of initial playback module 142 (not shown), authorization module 138, and/or authorizing data service 124 (not shown). The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and authorization module 151 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 or of authorization module 138 embodying any one or more of the methodologies or functions described herein. The sets of instructions of the system architecture 100 or of authorization module 138 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "adjusting", "receiving", "canceling", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
   receiving, by a content distribution network server located at a first geographic vicinity, a first request for content, the first request for content comprising an identifier of a location of the content;
   causing, by the content distribution network server, playback of the requested content to begin at a client device;
   receiving, by the content distribution network server, a content-based authentication token generated by the client device, wherein the content-based authentication token is associated with a second request for content that is initiated by the client device;

sending, by the content distribution network server, to a content sharing platform located at a second geographic vicinity, the content-based authentication token for verification by the content sharing platform; and responsive to receiving, by the content distribution network server, from the content sharing platform, an indication that the content-based authentication token is valid, causing playback of the requested content to continue at the client device.

2. The method of claim 1, wherein the first request comprises a parameter authorizing playback of an initial portion of the requested content and indicating that the valid content-based authentication token is required for playback of an additional portion of the requested content.

3. The method of claim 2, wherein the parameter indicates that the valid content-based authentication token is required to be received within a predetermined time period from the beginning of the playback of the requested content to avoid terminating the playback of the requested content and allow the playback of the additional portion of the requested content.

4. The method of claim 2, further comprising:
responsive to failing to receive the valid content-based authentication token, preventing the playback of the additional portion of the requested content.

5. The method of claim 1, wherein the first request is generated in response to validation of a session-based authentication token that pertains to a session between the client device and the content sharing platform.

6. The method of claim 1, wherein the playback of the requested content begins at the client device before generation of the valid content-based authentication token is completed at the client device.

7. The method of claim 1, wherein the valid content-based authentication token is generated by the client device based on the identifier of the requested content, an identifier of a client device application that issued the request for content, and data associated with a previous playback event initiated by the client device application.

8. A system comprising:
a memory; and
a processing device, coupled to the memory, to:
receive a first request for content, the first request for content comprising an identifier of a location of the content;
cause playback of the requested content to begin at a client device;
receive a content-based authentication token generated by the client device, wherein the content-based authentication token is associated with a second request for content that is initiated by the client device;
send, to a content sharing platform located at a different geographic vicinity, the content-based authentication token for verification by the content sharing platform; and
responsive to receiving, from the content sharing platform, an indication that the content-based authentication token is valid, cause playback of the requested content to continue at the client device.

9. The system of claim 8, wherein the first request comprises a parameter authorizing playback of an initial portion of the requested content and indicating that the valid content-based authentication token is required for playback of an additional portion of the requested content.

10. The system of claim 9, wherein the parameter indicates that the valid content-based authentication token is required to be received within a predetermined time period from the beginning of the playback of the requested content to avoid terminating the playback of the requested content and allow the playback of the additional portion of the requested content.

11. The system of claim 9, wherein the processing device is further to:
responsive to failing to receive the valid content-based authentication token, prevent the playback of the additional portion of the requested content.

12. The system of claim 8, wherein the first request is generated in response to validation of a session-based authentication token that pertains to a session between the client device and the content sharing platform.

13. The system of claim 8, wherein the playback of the requested content begins at the client device before generation of the valid content-based authentication token is completed at the client device.

14. The system of claim 8, wherein the valid content-based authentication token is generated by the client device based on the identifier of the requested content, an identifier of a client device application that issued the request for content, and data associated with a previous playback event initiated by the client device application.

15. A non-transitory computer-readable medium comprising instructions that, responsive to execution by a processing device, cause the processing device to perform operations comprising:
receiving a first request for content, the first request for content comprising an identifier of a location of the content;
causing playback of the requested content to begin at a client device;
receiving a content-based authentication token generated by the client device, wherein the content-based authentication token is associated with a second request for content that is initiated by the client device;
sending, to a content sharing platform located at a different geographic vicinity, the content-based authentication token for verification by the content sharing platform; and
responsive to receiving, from the content sharing platform, an indication that the content-based authentication token is valid, causing playback of the requested content to continue at the client device.

16. The non-transitory computer-readable medium of claim 15, wherein the first request comprises a parameter authorizing playback of an initial portion of the requested content and indicating that the valid content-based authentication token is required for playback of an additional portion of the requested content.

17. The non-transitory computer-readable medium of claim 16, wherein the parameter indicates that the valid content-based authentication token is required to be received within a predetermined time period from the beginning of the playback of the requested content to avoid terminating the playback of the requested content and allow the playback of the additional portion of the requested content.

18. The non-transitory computer-readable medium of claim 16, wherein the instructions further comprise:
responsive to failing to receive the valid content-based authentication token, preventing the playback of the additional portion of the requested content.

19. The non-transitory computer-readable medium of claim 15, wherein the first request is generated in response to validation of a session-based authentication token that pertains to a session between the client device and the content sharing platform.

20. The non-transitory computer-readable medium of claim 15, wherein the playback of the requested content begins at the client device before generation of the valid content-based authentication token is completed at the client device.

* * * * *